United States Patent [19]
Jutras

[11] 4,313,512
[45] Feb. 2, 1982

[54] AIR CUSHION VEHICLE

[76] Inventor: Mario Jutras, 2430 Boulogne Ave., Longueuil, Canada, J4L 2J6

[21] Appl. No.: 120,262

[22] Filed: Feb. 11, 1980

[51] Int. Cl.³ .......................... B60V 1/04; B60V 1/06
[52] U.S. Cl. .................................... 180/117; 180/126
[58] Field of Search ............... 180/126, 127, 129, 116, 180/117, 120; 114/67 A

[56] References Cited

U.S. PATENT DOCUMENTS

| | | | |
|---|---|---|---|
| 3,039,550 | 6/1962 | Beardsley | 180/116 |
| 3,150,731 | 9/1964 | Franklin et al. | 180/120 |
| 3,195,665 | 7/1965 | Beardsley | 180/116 |
| 3,341,125 | 9/1967 | Sweeney et al. | 180/117 X |
| 3,791,478 | 2/1974 | Remon-Beauvais et al. | 180/127 X |

FOREIGN PATENT DOCUMENTS

| | | |
|---|---|---|
| 704393 | 2/1965 | Canada . |
| 714425 | 7/1965 | Canada . |
| 739317 | 7/1966 | Canada . |
| 790446 | 7/1968 | Canada . |
| 1008930 | 11/1965 | United Kingdom ............... 180/116 |

*Primary Examiner*—John A. Pekar

[57] ABSTRACT

An air cushion vehicle is disclosed adapted to be constructed as a toy or as a large scale fully-operational vehicle. The vehicle consists of a body shell having a plenum chamber open to the surface over which the vehicle rides, a funnel mounted on the top surface of the shell and communicating with an air flow chamber separated by a floor from the plenum chamber. The funnel is provided with a powered-axial type blower. A plurality of vanes radiate outwardly from the funnel, in the air flow chamber terminating short of the peripheral wall of the vehicle, as does the floor, thus defining a peripheral opening for the air flow to pass into the plenum chamber. The peripheral wall is inwardly curved. An outwardly, downwardly extending flange is secured to the peripheral wall for stabilizing the vehicle and also for extra lift.

11 Claims, 7 Drawing Figures

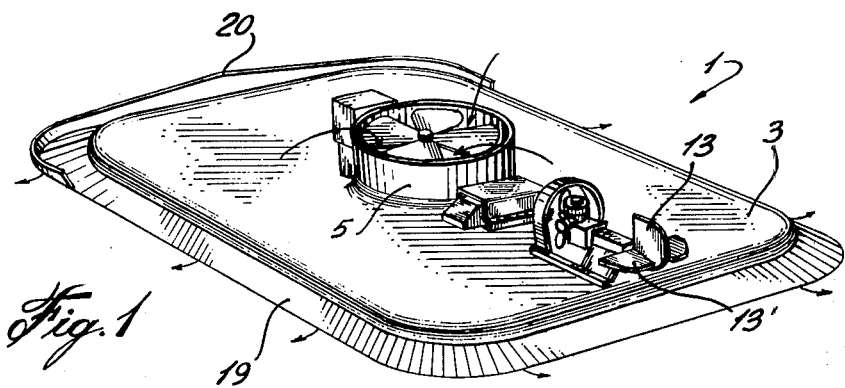
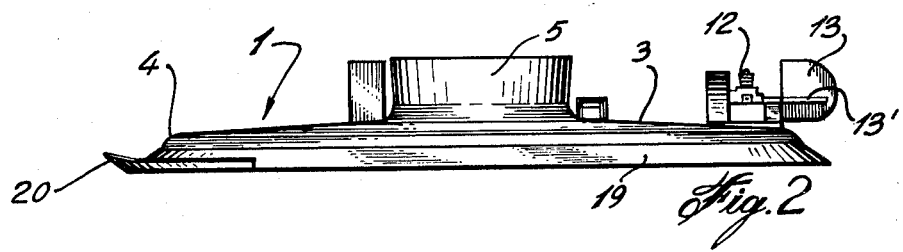
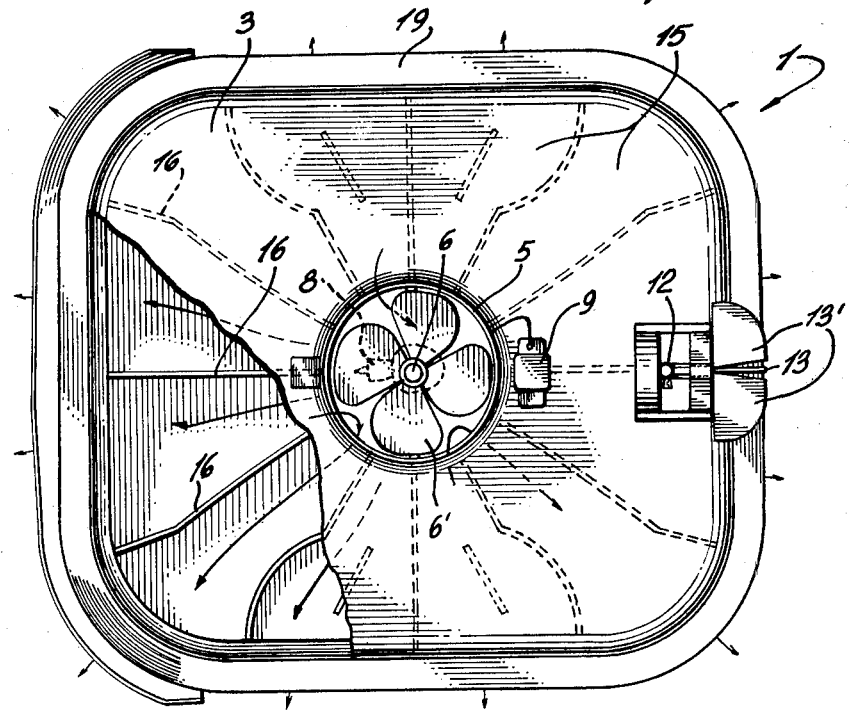

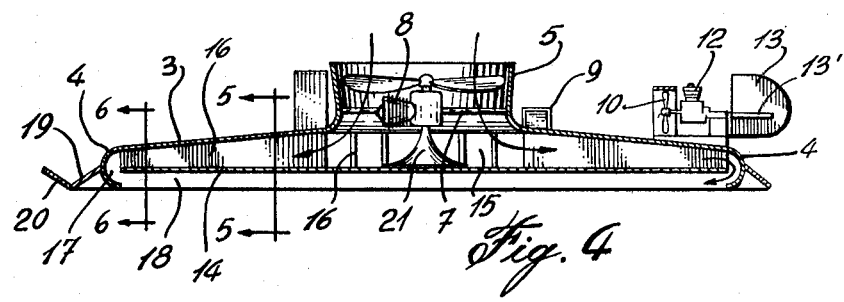
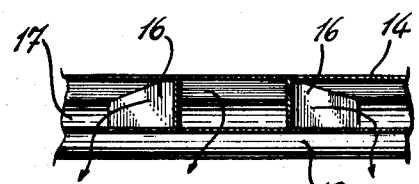
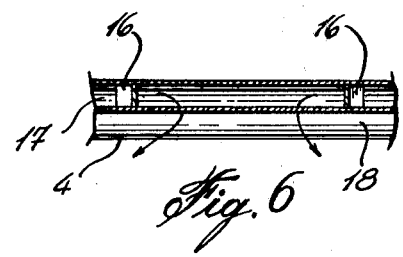
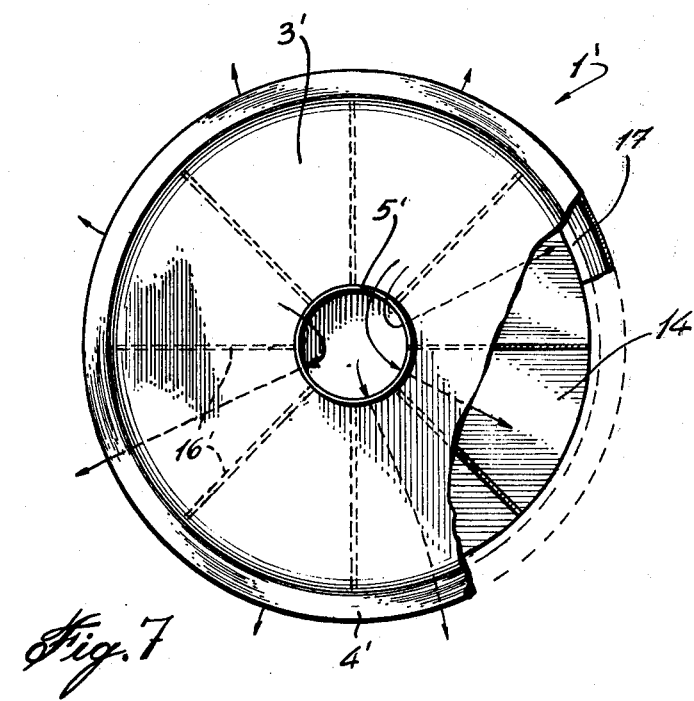

AIR CUSHION VEHICLE

FIELD OF THE INVENTION

The present invention relates to vehicles designed to move over land and water by means of an air cushion created under the structure of the vehicle.

BACKGROUND OF THE INVENTION

Air cushion vehicles are known. The present invention is an improvement over the type of air cushion vehicle illustrated in U.S. Pat. No. 3,039,550 dated June 19, 1962 having a downwardly directed and inwardly curved peripheral skirt for guiding the air flowing around and under the periphery of the vehicle. This vehicle lacks stability because the air flow is not evenly distributed around the vehicle periphery. Also, the height-lift-power characteristics could be improved.

OBJECTS OF THE INVENTION

Accordingly, it is a first object of the present invention to provide an air cushion vehicle having improved lift and stability characteristics.

It is another object of the present invention to provide an air cushion vehicle having a structural design adapted for use as a toy as well as a large scale directed to the transportation of people and/or freight.

SUMMARY OF THE INVENTION

The vehicle disclosed has a body shell in which is centrally mounted a fan or blower. This latter is powered by a suitable energy source.

The fan blows outside air into a plurality of channels radially disposed underneath the former and extending to the periphery of the body shell but not quite meeting the outer wall of the body shell. This outer wall curves downwardly and inwardly, extending below the common floor of the channels, defining an air plenum chamber. The channels deliver equal amount of air all around the body shell. Preferably, an auxiliary flange, outwardly and downwardly extending, is rigidly secured to the outer wall all along the periphery defined by the latter. The purpose of the auxiliary flange confers stability and also increased lift to the vehicle.

Air flows through the channels toward the periphery of the body shell in a direction perpendicular to said periphery, and the air is deviated downwardly and inwardly into the air plenum chamber, again perpendicular to said periphery, when the vehicle is seen in top plan view. Pressure is created therein, lifting the vehicle off the surface on which it stands such that it "floats" on the air cushion in the plenum chamber.

The above will be more clearly understood by referring to preferred embodiments of the invention, illustrated by way of the accompanying drawings, in which:

BRIEF DESCRIPTION OF THE DRAWINGS

FIG. 1 is a perspective view of a first embodiment of the air cushion vehicle;

FIG. 2 is a side elevation of the vehicle shown in FIG. 1;

FIG. 3 is a top plan view, partially broken away, of the first embodiment;

FIG. 4 is a vertical central cross-section of the first embodiment;

FIG. 5 is a partial lateral section taken along line 5—5 of FIG. 4;

FIG. 6 is a partial lateral section taken along line 6—6 of FIG. 4; and

FIG. 7 is a top plan view, partially broken away, of a second embodiment of the air cushion vehicle.

Like numerals refer to like elements throughout the drawings.

DETAILED DESCRIPTION OF THE INVENTION

The air cushion vehicle has a generally rectangular rigid body shell 1. Shell 1 has a top wall 3. The latter curves downwardly and inwardly at its edges (as seen clearly in FIG. 4) to define a rigid peripheral skirt 4.

An upright slightly frusto-conical funnel 5 is centrally mounted on top surface 3 and communicates with the interior of the shell 1. An axial type blower or fan 6 is mounted horizontally inside funnel 5 and fixedly secured thereto by means of flange member 7 (seen in FIG. 4). Blower 6 is powered by a small gasoline engine 8, which is electrically connected to a battery 9, only for the starting of the engine. Engine 8 is of the type used to power miniature model airplanes, although it is to be understood that if the air cushion vehicle is built on a large enough scale to carry passengers or freight, a correspondingly powerful motor would be used.

It is to be noted that fan 6 is provided with wide blades 6'. These have been found to be more efficacious than the relatively narrow blades of a conventional propeller, because much of the fluid turbulence is eliminated.

A propeller 10 is longitudinally secured to top surface 3 adjacent the aft side 11 of vehicle 1. Propeller 10 is powered by a second gasoline engine 12. If so desired, a tail fin 13 and two ailerons 13' could be provided as well as means to teleguide vehicle 1, although these features are not essential to the invention.

As mentioned above, funnel 5 communicates with the interior of shell 2. This interior is bounded by top surface 3, peripheral skirt 4 and a horizontal floor 14, as shown clearly in FIG. 4, thus forming an air flow chamber 15. A cone 21 having a concavely-curved surface is provided in the latter under fan 6 to reduce air turbulence.

A plurality of vanes 16 radiating outwardly towards the peripheral wall 4 separate chamber 15 into several compartments in order to eliminate as much air turbulence as possible. Vane segments 16' are located in some compartments to further reduce air turbulence. Vanes 16 and 16' are oriented such as to direct the air flow so that it hits skirt 4 at right angles when the vehicle is seen in plan view. Vanes 16 stop short of peripheral wall 4, as does the floor 14, to define a peripheral opening 17, whereby the flow of air may pass downwardly and inwardly into the air plenum chamber 18. It is to be noted that all the compartments have equal entry openings adjacent fan 6 in terms of cross-sectional area and also have equal exit openings adjacent peripheral wall 4, again in terms of cross-sectional area. It has been found that the ratio of the entry cross-sectional area to the exit cross-sectional area must be equal to a certain constant for all compartments, if the vehicle is to have maximum lift. Preferably, this constant is one and is obtained by a higher height of the entry openings than the exit openings of the compartments. For optimum results, each compartment has also a constant cross-sectional area throughout its length.

The flow of air is indicated by the arrows in FIG. 4.

Vehicle 1 also includes an outwardly and downwardly projecting flange 19, rigidly secured to the outer surface of peripheral skirt 4. Flange 19 can be rigid or somewhat flexible. As seen clearly in FIG. 4, the lower edge of flange 19 lies in the same plane as the lower edge of peripheral skirt 4. Flange 19 is designed to provide stability as well as extra lift.

Air escaping past the lower free edge of skirt 4 becomes turbulent and at least a portion of said air hits the underface of flange 19 and is downwardly deflected, producing an upward thrust for extra lift.

If the air gap on one side of the vehicle becomes higher than the normal operational air gap, then the air gap on the opposite side becomes lower than normal air gap. Therefore, the attack angle of the air hitting flange 19 decreases at the higher side of the vehicle and increases at the lower side. The upward thrust is greater at the lower side and stability is restored; that is, a substantially uniform air gap all around the vehicle.

An obstacle flange 20 is provided along the front side of vehicle 1. This flange 20 projects upwardly and outwardly from the lower edge of flange 19 and also extends around to the front and portions of both lateral sides of vehicle 1. Thus, any obstacle encountered by vehicle 1 in its forward motion will pass under flange 20.

FIG. 7 shows an alternate embodiment of the invention. Shell 1' is very similar to shell 1, except that it is round in shape rather than rectangular. It includes a top wall 3', a centrally-located funnel 5', a fan and power means to operate the fan (not shown), a peripheral skirt 4', a horizontal floor 14, an air flow chamber, a plurality of equally spaced-apart radial vanes 16', and a peripheral opening 17, whereby the flow of air is directed downwardly and radially inwardly into the air plenum chamber. Vehicle 1' is provided with a peripheral flange 19 for the purpose described hereinabove.

Referring to the first embodiment of FIGS. 1 to 6, it is not essential that funnel 5 be centrally located. It can be positioned, for instance, rearwardly of the vehicle center along its longitudinal center line for the installation of a passenger compartment ahead of funnel 5. However, in this case, the overall center of gravity of the vehicle and its load must be located as close as possible to the center of the vehicle, by the addition of properly located additional weights, if necessary. Also, for good stability, the center of gravity must be as low as possible.

What I claim is:

1. An air cushion vehicle comprising a body shell having an inwardly and downwardly curved peripheral rigid skirt and a top wall, and a plenum chamber open to the surface over which the vehicle rides; further having an upright air inlet funnel mounted on said top wall, open at the top and communicating with the interior of said body shell; a motor-driven fan mounted inside said funnel; an air flow chamber extending from underneath said funnel to the said peripheral skirt and bounded by said top wall and having a horizontal floor which stops short of said peripheral wall, thus defining a peripheral opening, whereby air passes from said air flow chamber to said plenum chamber; said air flow chamber having a plurality of equally spaced-apart vanes radiating outwardly from under the circumferential edge of said funnel and terminating short of said peripheral wall, said vanes defining a plurality of separate channels in said air flow chamber, whereby air turbulence is substantially eliminated and substantially uniform air flow along the periphery of said body shell is obtained, said peripheral skirt being provided with a downwardly, outwardly extending flange, the lower edge of which lies in substantially the same plane as the bottom edge of said peripheral skirt to provide stability and extra lift to the vehicle.

2. An air cushion vehicle as defined in claim 1, wherein said body shell is in the shape of a rectangle.

3. An air cushion vehicle as defined in claim 2, wherein a longitudinally-oriented propeller is mounted on the said top wall of the vehicle adjacent the aft side of the same.

4. An air cushion vehicle as defined in claim 3, wherein said propeller is provided with a pair of ailerons and a tail fin.

5. An air cushion vehicle as defined in claim 2, wherein the front portion of said flange has an upwardly outwardly extending obstacle flange rigidly secured to the lower edge of the former.

6. An air cushion vehicle as defined in claim 1, wherein an upright cone is located in said air flow chamber directly underneath said fan, whereby air flows with less turbulence into said air flow chamber.

7. An air cushion vehicle as defined in claim 1, wherein the vehicle body shell is generally round.

8. An air cushion vehicle as defined in claim 1, 2 or 7, wherein said channels have entry and exit openings, which are all of equal cross-sectional areas.

9. An air cushion vehicle as defined in claim 1, 2 or 7, wherein said vanes are oriented so as to guide the air in said channels in a direction at substantially right angles to said skirt when the vehicle is seen in plan view.

10. An air cushion vehicle as defined in claim 1, 2 or 7, wherein said channels have a substantially constant cross-sectional area throughout their length and the cross-sectional area of all channels is substantially equal.

11. An air cushion vehicle as defined in claim 1, 2 or 7, wherein said vanes are oriented so as to guide the air in said channels in a direction at substantially right angles to said skirt when the vehicle is seen in plan view and wherein said channels have a substantially constant cross-sectional area throughout their length and the cross-sectional area of all channels is substantially equal.

* * * * *